United States Patent [19]
Schmidt-Hebbel

[11] Patent Number: 5,089,685
[45] Date of Patent: Feb. 18, 1992

[54] METHOD OF AND ARRANGEMENT FOR MEASURING THE SIZE OF THROUGHGOING OPENINGS

[75] Inventor: Robert Schmidt-Hebbel, Erlangen, Fed. Rep. of Germany

[73] Assignee: Robert Bosch GmbH, Stuttgart, Fed. Rep. of Germany

[21] Appl. No.: 606,067

[22] Filed: Oct. 29, 1990

[30] Foreign Application Priority Data

Dec. 21, 1989 [DE] Fed. Rep. of Germany ....... 3942299

[51] Int. Cl.⁵ .............................................. B23K 26/02
[52] U.S. Cl. .............................. 219/121.83; 219/121.7; 219/121.84
[58] Field of Search ........... 219/121.7, 121.71, 121.83, 219/121.84

[56] References Cited

FOREIGN PATENT DOCUMENTS 0965677 10/1982 U.S.S.R. ............................ 219/121.7

*Primary Examiner*—C. L. Albritton
*Attorney, Agent, or Firm*—Michael J. Striker

[57] ABSTRACT

Measurements of a value of throughgoing openings and workpieces produced during drilling with energy radiation, and particularly laser radiation are performed by producing each opening by several successive energy pulses with focal points offset relative to an axis of the opening, and determining measuring values from a fluid which passes through the throughgoing opening and is supplied to an opening region of the workpiece with a predetermined, constant pressure.

8 Claims, 1 Drawing Sheet

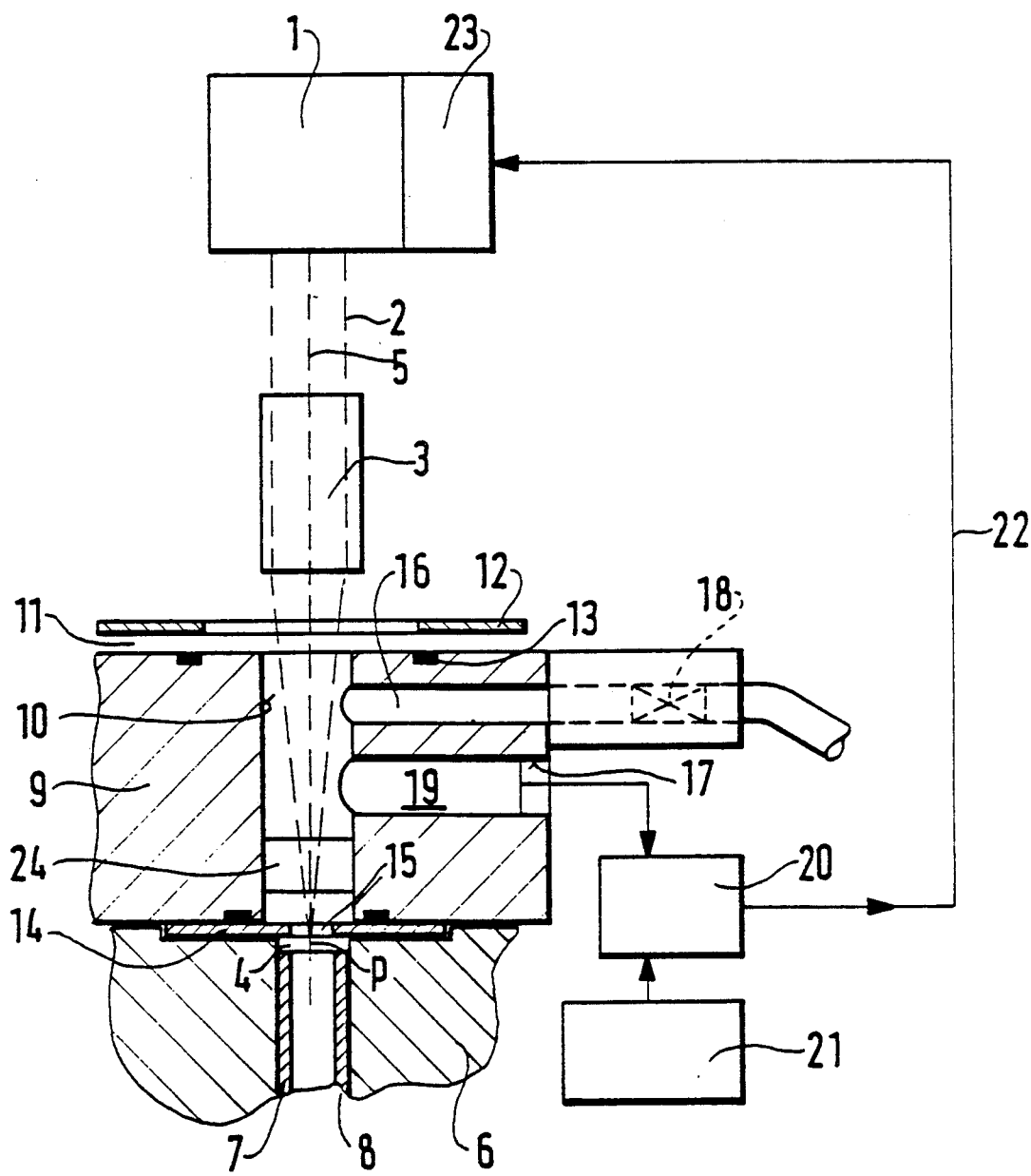

METHOD OF AND ARRANGEMENT FOR MEASURING THE SIZE OF THROUGHGOING OPENINGS

BACKGROUND OF THE INVENTION

The present invention relates to a method of and an arrangement for measuring a size of highly throughgoing openings produced energy radiation, for example laser radiation in workpieces during a working process.

More particularly it relates to a method of measurement of the above mentioned type in which each opening is produced by several successive energy pulses with focal points offset relative to an axis of the opening.

German document DE-OS 1,790,128 discloses a method and an arrangement for drilling workpieces, especially watch stones by means of a laser radiation, in which each opening is produced by several successive pulses with focal points offset transversely to the opening axis. The desired opening diameter can be produced by energy pulses acting annularly around the axis of the opening to be produced, and the eccentricity of the focal points of individual pulses relative the axis of the opening to be produced is correspondingly adjusted. For this purpose preferably an optical system with movable optical means for displacing the focal point transversely to the optical axis is utilized. The number of power of the pulses must be empirically determined, depending on the diameter of the borehole, the thickness of the workpiece, the material properties and other parameters.

SUMMARY OF THE INVENTION

Accordingly, it is an object of the present invention to provide a method of the above mentioned general type which avoids the disadvantages of the prior art.

More particularly, it is an object of the present invention to provide a method in accordance with which respective values of the borehole can be converted during the working process continuously to adequate measuring values which can be used for controlling respective regulation of the pulse duration and pulse power as well as for interrupting the energy radiation, for example by switching off of the energy source.

In keeping with these objects and with others which will become apparent hereinafter, one feature of the present invention resides, briefly stated, in that the measuring value is produced from a fluid which flows out of the throughgoing opening and is supplied to the region of the opening in the workpiece with a predetermined, constant pressure.

When the method is performed in accordance with the present invention, it avoids the disadvantages of the prior art and achieves the above mentioned objects.

In the inventive method it is possible to produce throughgoing openings of predetermined size in materials with different thicknesses and properties within a predetermined time interval, and the energy supply is automatically interrupted after reaching of the nominal size of the opening. Since the measuring value in accordance with the present invention is produced from the fluid flowing out of the throughgoing opening and supplied to the opening region of the workpiece with a predetermined, constant pressure, very accurate results are produced with low costs and independently of the energy radiation and its action. This advantageously contrasts with a known power control of a laser during welding, soldering, cutting or perforation, in dependence on the reflected radiation from the workpiece, in which case after reaching the predetermined intensity of the radiation, the laser is switched off or the laser beam is interrupted by a cover.

From the fluid flowing through the throughgoing opening, and adequate measuring value can be produced, which detects and evaluates the throughflow quantity per time unit by a throughflow quantity meter connected with the opening.

Another advantageous possibility is that the measuring value can be produced during making of the throughgoing opening by a pressure drop of the fluid as a function of the corresponding size of the opening with use of a high sensitive pressure sensor.

The fluid can be composed preferably of a gas or a gas mixture, particularly a protective gas for influencing the radiation-inducing plasma. During treatment of materials with laser radiation during high radiation power a plasma is formed which prevents the energy transmission to the workpiece due to its absorption of the laser light. For making electrons responsive for the absorption not damaging, the working place is subjected to the action of helium or another suitable protective gas.

An arrangement which is especially suitable for performing the inventive method has a pressure-tight chamber for receiving the workpiece, a supply passage and a withdrawal passage communicating with the chamber for supplying and withdrawing of fluid, and a cover of an energy radiation permeable material which covers the chamber at its end facing the radiation source.

A pressure sensitive sensor can be arranged in the chamber and generate output signals to be compared with a signal produced by a nominal value generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing an arrangement for producing throughgoing openings in workpieces by energy radiation as well as measuring the size of an opening during a working process, for the method in accordance with the present invention.

DESCRIPTION OF THE PREFERRED EMBODIMENT

A laser of a known construction is identified in the FIGURE with reference numeral 1. It generates a parallel bundle of rays 2 having substantially a single wavelength. The bundle of rays 2 passes through a tube 3 having a vertical axis. The tube is provided with not shown, motor driven optical elements which can concentrate the laser beam in a focal point P located in a plane of a workpiece 4 to be treated. In the shown embodiment the workpiece 4 is a plain disc in which a throughgoing opening of a predetermined size made by the concentrated laser beam. The plain disc 4 can be a component of a fuel injection nozzle. In this case it is composed of a high strength metallic or ceramic material.

The tube 3 has an adjustable optics, with which the focal point P of the laser beam can be displaced transversely to the optical axis 5 coinciding with the axis of the opening. Each opening is produced by several, sharply bundled laser pulses, whose diameter is smaller than the nominal diameter of the throughgoing opening after completed treatment. It is advantageously performed in that first a laser beam pulse or several successive pulses produce in the region of the opening surface of the workpiece 4 a central throughgoing opening with a smaller diameter than the nominal diameter. Then, this central opening is extended by drilling along its periphery by further laser pulses to its nominal diameter. The focal points of the individual pulses can be displaced relative to one another concentrically to the axis of the opening along a circle or a spiral. Especially the focal points of the pulses after producing of the central opening are uniformly distributed centrally symmetrically to the opening axis. The number of the required pulses and their energy can be selected differently in dependence on the diameter of the opening to be produced, and at least at the beginning of the working pulses with increasing energy are used.

As can be seen from the drawing, a workpiece receptacle is provided in a movable connecting block 6 for the plane disc 4. The disc is centered and fixed in vertical and horizontal directions relative to the axis 5 of the laser beam. The workpiece receptacle is formed by a vertical throughgoing opening 7 provided in the connecting block 6 and an end surface of a sleeve 8 which is anchored in the opening 7. The diameter of the opening corresponds to the outer diameter of the disc 4.

The connecting block 6 is arranged movably in a vertical direction between a loading position and a closing position. In the loading position of the connecting block a not drilled disc 4 is inserted from above into the workpiece receptacle 7, 8. In the closing position the block 6 abuts against the lower side of a stationary block 9 so as to pressure-tightly close a chamber 10 formed in the block 9.

The pressure chamber 10 in the shown example is formed by a vertical opening extending concentrically to the opening 7 and the optical axis 5. The end of the opening facing toward the tube 3 is pressure tightly closed by a window 11 composed of a material which permeable for the laser beam. A pressing ring 12 screwed with the block 9 presses the window 11 against a ring seal 13 which is partially received in the block 9.

The other side of the pressure chamber 10 is closed by the plane disc 4 located in the workpiece receptacle 7, 8. In the closing position of the connecting block 6 it is pressed against a sealing disc 14 which is screwed with a stationary block 9 and provided with a central opening 15.

The block 9 also has transverse openings 16 and 17 which open in the chamber 10. A not shown pressure generator, is connected with the upper transverse opening 16. The pressure generator is formed for example as a pump which supplies a fluid, particularly a protective gas, into the chamber 10. A reducing valve 18 arranged between it and the pressure generator maintains the pressure of a fluid flowing into the chamber at a predetermined constant value.

A pressure sensor 19 is arranged in the opening 17 and detects respective filling pressure of the chamber. The actual value of the output signal of the pressure sensor 19 is supplied to a comparator 20 connected with a nominal value generator 21. The difference signal between the actual value and the nominal value is supplied through a conductor 22 to a regulating and switching off circuit 23 associated with the laser 1.

The arrangement in accordance with the present invention operates in the following manner:

When the chamber 10 is closed and the not treated workpiece 4 is inserted, the pressure generator is turned on and a fluid flows, especially a protective gas, flows through the reducing valve 18 and the opening 16 into the chamber 10. The reducing valve 18 maintains the quantity of the fluid flowing to the chamber 10 per time unit at a constant level and interrupts the fluid supply when a predetermined filling pressure in the chamber is achieved.

Then the laser 1 turned on so as to provide several, successive energy pulses and therefore to form a throughgoing opening of an exactly defined size in the plain disc 4. With a first radiation pulse for a pulse series, a central opening with a diameter smaller than a nominal diameter is produced. Then by further laser pulses with focal points offset transversely to the axis of the opening by respective adjustment of the tube 3 are delivered so as to expand the opening to the nominal size. The above mentioned situation and the required means for it are known from German reference DE-OS 197,128.

When the plain disc 4 is drilled, a pressure drop occurs in the chamber 10 since the fluid quantity supplied through the reducing valve 18 is smaller than the fluid quantity discharging through the opening and the sleeve 8. This pressure drop increases with increased size of the borehole. It is detected by the pressure sensor 19 and supplied as an electrical signal to the comparator 20. With increasing expansion of the opening the value of the pressure sensor signal approximates to the value of the signal supplied from the nominal value generator 21 to the comparator 20. Upon reaching of a predetermined difference between both signals and have the value 0, the laser 1 is switched off by the circuit 23.

The signal supplied from the pressure sensor 19 as a function of the pressure drop in the chamber can be compared continuously or with time intervals with nominal value signals of the nominal value generator 21, so as to regulate the laser power by increasing or reducing of the pulse energy during the drilling process. This can be used for example when work-pieces with different thicknesses and/or material properties must be treated one after the other.

Instead of working with a positive pressure, also a negative pressure of a predetermined magnitude can be produced in the chamber 10 by a corresponding pump connected with the opening 16. During making the opening in the plain disc 4, the negative pressure in the chamber drops relative to the surrounding pressure in the sleeve 8. The pressure drop can be detected by a sensor and evaluated through a corresponding switching to provide power control and/or interruption of the laser beam.

An evaluated measuring magnitude of the respective values of the throughgoing opening can also be produced alternatively from the throughflow quantity of the fluid per time unit. For this purpose a throughflow quantity meter 24 can be arranged in the chamber 10 and connected with its outer side with the regulating circuit 23 of the laser 1. The throughflow or quantity meter can be formed so that it detects the discharging stream of fluid from the chamber due to a negative pressure produced there or can detect the inflow of surrounding air into the chamber due to the negative pressure produced in the chamber. It is important that the measuring values are produced from the fluid which flows out of the throughgoing opening and supplied to the bore of the workpiece with a predetermined constant pressure.

The fluid which is used here can be a protective gas, such as for example helium, to increase the combination of ions and electrons and thereby to reduce the electron density in the plasma. The plasma absorbs a part of the radiation energy and protects the workpiece from impinging laser beam. This cleaning is performed in that the plasma is released from the outer surface of the workpiece. The spring action of the plasma can be so high that the penetrating residual radiation is not sufficient to maintain the melting or evaporation process on the workpiece.

It will be understood that each of the elements described above, or two or more together, may also find a useful application in other types of constructions differing from the types described above.

While the invention has been illustrated and described as embodied in a method of measuring a value of throughgoing openings and workpieces produced during drilling with energy radiation, and particularly laser radiation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for measuring throughgoing openings produced by energy radiation, in particular laser radiation, comprising a pressure-tightly closeable chamber for a workpiece; a supply channel and a withdrawal channel for supplying a fluid to said chamber and withdrawing the fluid from said chamber; a radiation source; a window provided adjacent to said chamber at its side facing toward said radiation source; and radiation permeable material pressure-tightly closing said window.

2. An arrangement as defined in claim 1, wherein said chamber has a side opposite to said window and is pressure-tightly closed at said side by the workpiece to be treated.

3. An arrangement as defined in claim 1; and further comprising a movable connecting block provided with a workpiece receptacle, and after inserting of the workpiece, abutting against said chamber at its side which is opposite to said window so as to pressure-tightly close said chamber.

4. An arrangement as defined in claim 2; and further comprising a movable connecting block provided with a workpiece receptacle, and after inserting of the workpiece, abutting against said chamber at its side which is opposite to said window so as to pressure-tightly close said chamber.

5. An arrangement as defined in claim 1; and further comprising a block composed of a massive material, said chamber being formed as an opening in said block, said block having at least one further opening for supplying a fluid.

6. An arrangement as defined in claim 2; and further comprising a block composed of a massive material, said chamber being formed as an opening in said block, said block having at least one further opening for supplying a fluid.

7. An arrangement as defined in claim 1; and further comprising a pressure sensor arranged in said chamber and producing output signals which are compared with nominal signals; and a nominal signal generated by producing said nominal signal.

8. An arrangement as defined in claim 3, wherein said connecting block has an additional opening; and further comprising a throughflow quantity meter arranged in said additional opening and detecting a quantity of fluid flowing through the opening of the workpiece; and means for evaluating output signals of said throughflow quantity meter for controlling and/or switching off of a radiation source.

* * * * *